United States Patent
Weule

(10) Patent No.: US 8,047,349 B2
(45) Date of Patent: Nov. 1, 2011

(54) ELECTROMOTIVE ACTUATOR FOR DEFLECTING A MOTOR VEHICLE PART

(75) Inventor: Jan Weule, Duisburg (DE)

(73) Assignee: ZF Friedrichshafen AG, Friedrichshafen (DE)

(*) Notice: Subject to any disclaimer, the term of this patent is extended or adjusted under 35 U.S.C. 154(b) by 936 days.

(21) Appl. No.: 11/852,469

(22) Filed: Sep. 10, 2007

(65) Prior Publication Data
US 2008/0078644 A1    Apr. 3, 2008

(30) Foreign Application Priority Data
Sep. 9, 2006    (DE) .......................... 10 2006 042 477

(51) Int. Cl.
F16D 28/00    (2006.01)
(52) U.S. Cl. ............. 192/84.6; 192/90; 192/94; 192/98; 310/20; 74/89.34; 74/89.4
(58) Field of Classification Search ................. 192/84.6, 192/90, 94, 84.7, 98; 310/20, 12.14, 80; 74/89.34, 89.4
See application file for complete search history.

(56) References Cited

U.S. PATENT DOCUMENTS

| | | | |
|---|---|---|---|
| 1,639,681 A * | 8/1927 | Berlin .......................... 411/277 |
| 2,072,832 A * | 3/1937 | Weydell ........................ 192/3.56 |
| 3,235,045 A * | 2/1966 | Pop .............................. 192/18 B |
| 3,660,704 A * | 5/1972 | Paine et al. ...................... 310/80 |
| 4,805,486 A | 2/1989 | Hagiwara et al. |
| 4,865,173 A * | 9/1989 | Leigh-Monstevens et al. ............................. 192/3.63 |
| 5,267,635 A * | 12/1993 | Peterson et al. ................. 192/90 |
| 5,324,047 A * | 6/1994 | Organ et al. ................... 277/354 |
| 5,844,335 A | 12/1998 | Sekiguchi et al. |
| 5,934,430 A * | 8/1999 | Kolomeitsev et al. ........ 192/84.6 |
| 5,982,053 A * | 11/1999 | Chitayat ..................... 310/12.21 |
| 7,014,587 B2 * | 3/2006 | Grundl et al. ...................... 475/5 |
| 2008/0064505 A1 * | 3/2008 | Weule ............................... 464/2 |

FOREIGN PATENT DOCUMENTS

| | | |
|---|---|---|
| DE | 19511287 | 1/1996 |
| DE | 19712275 | 10/1997 |
| DE | 10348312 | 5/2005 |
| DE | 102005017026 | 12/2005 |
| EP | 0368140 | 5/1990 |

* cited by examiner

*Primary Examiner* — David D Le
*Assistant Examiner* — Terry Chau
(74) *Attorney, Agent, or Firm* — Leydig, Voit & Mayer, Ltd.

(57) ABSTRACT

An electromotive actuator for deflecting a motor vehicle part includes a rotatable component and a non-rotatable component. The rotatable component can be driven by an electric motor in such a way that it can be moved linearly relative to the non-rotatable component between a first position and a second position. In order to create a compact adjustment device, the two components of the actuator are configured respectively as a threaded spindle and a threaded nut, whereby the rotatable component (threaded spindle or threaded nut) is non-rotatably connected to the rotor of the electric motor and can act directly or indirectly on the vehicle part that is to be deflected.

19 Claims, 1 Drawing Sheet

ELECTROMOTIVE ACTUATOR FOR DEFLECTING A MOTOR VEHICLE PART

Priority is claimed to German Patent Application No. DE 10 2006 042 477.8, filed on Sep. 9, 2006, the entire disclosure of which is incorporated by reference herein.

The present invention relates to an electromotive actuator for deflecting a motor vehicle part.

BACKGROUND

Modern vehicles contain a relatively large number of electric actuators with which the rotational movement generated by an electric motor that can be actuated by a control device is converted into a linear or rectilinear movement of the vehicle component that is to be moved. A special area of application of such actuators is in the automatic actuation of a starting and shifting clutch of a motor vehicle, whereby the component that is to be actuated can be, for example, a so-called central clutch release device of the friction clutch. During actuation, such a central clutch release device acts, for example, on the diaphragm spring of the clutch in such a way that it is released or brought into a slip position in which the clutch can transmit no torque at all or only a reduced torque from the drive engine of the vehicle to the gear.

Various deflection gears have become known for purposes of converting the rotational movement of the rotor of the electric motor into a rectilinear movement. Thus, for example, deflection gears are used in conjunction with actively controllable multi-disk clutches and these deflection gears are used on axle or middle differentials as differential locks and in a power train with selectable four-wheel drive as a selectable clutch of a drive axle that can be activated as needed. By means of the deflection gear, an externally generated controlling torque is continuously converted at a high transmission ratio into an axial contact force in order to actuate, that is to say, in order to at least partial close, an associated multi-disk clutch.

Two embodiments of a differential gear with a disk lock that can be actuated by means of an electric motor via such a deflection gear are described in EP 0 368 140 B1. According to a first embodiment, in FIG. 1, the differential gear is configured with a bevel wheel design. A support ring is drive-connected via a bevel wheel of a reduction gear to an electric motor that is affixed to the housing. An adjusting ring is mounted non-rotatably and axially movably on the housing side and is connected directly to the support ring via cam tracks. Hence, a rotation of the support ring is converted into an axial movement of the adjusting ring which is connected—via an axial thrust bearing, via an outer pressure plate that rotates together with the differential cage via several tappets that penetrate the differential cage and via an inner pressure plate—to the multi-disk clutch, whose disks are arranged operatively between the differential cage and one of the two output bevel wheels.

In a second variant according to FIG. 2 in the above-mentioned application, the differential gear is configured with a planetary design. The support ring here is mounted non-rotatably and axially immovably on the housing side. In contrast, the adjusting ring is mounted rotatably and axially movably and, on the one hand, it is drive-connected via the pinion of a reduction gear to an electric motor that is affixed to the housing, and on the other hand, it is connected to the support ring via several ball grooves that ascend on the circumference side and via rolling elements arranged therein. Therefore, a rotation of the adjusting ring is converted by a rolling movement of the rolling elements between the opposing axially ascending ball grooves into an axial movement of the adjusting ring which is connected—via an outer axial thrust bearing, via an outer pressure plate that rotates together with the differential cage, via several first tappets that penetrate the differential cage, via a first inner pressure plate, via an inner axial thrust bearing, via a thrust washer, via several second tappets that penetrate the center pin of the planetary carrier and via a second inner pressure plate—to the multi-disk clutch, whose disks are arranged operatively between the differential cage and the sun wheel of the differential gear.

Another differential gear with a disk lock that can be actuated by means of an electric motor via a similar deflection gear is known from U.S. Pat. No. 4,805,486 A. With this differential gear, a support ring is mounted non-rotatably and axially immovably on the housing side. An adjusting ring is supported rotatably as well as axially movably, and on the one hand, it is drive-connected via the pinion of a reduction gear to an electric motor that is affixed to the housing and, on the other hand, it is connected—either via cam surfaces that ascend on the circumference side (see FIG. 2 there) or via ramp surfaces that ascend on the circumference side and via rolling elements arranged therein (see FIG. 3 there)—to the support ring. A rotation of the adjusting ring is thus converted by a sliding movement of the opposing axially ascending cam surfaces or by a rolling movement of the rolling elements between the opposing axially ascending ramp surfaces into an axial movement of the adjusting ring which is connected—via an outer axial thrust bearing, via an outer pressure plate, via several pistons that penetrate the differential cage and via an inner pressure ring—to the multi-disk clutch, whose disks are arranged operatively between the differential cage and one of the two output bevel wheels of the differential gear.

Only for the sake of completing the known state of the art, reference is hereby made to German patent application DE 103 48 312 A1 that discloses an actuation device for a friction coupling device with which a clutch actuator equipped with the described ball ramps can be actuated by means of a bowden cable.

All of these known deflection gears have in common the fact that the axially ascending ramp and cam surfaces are oriented towards the circumference. As a consequence, the corresponding operative contours are each limited to a relatively small rotational angle sector of the input element, disadvantageously resulting in a relatively small transmission ratio between the rotational movement and the torque of the input element as well as the axial movement and the axial contact force of each associated output element. A precise setting of a desired locking power or closing power by means of the axial contact force acting on the appertaining multi-disk clutch is thus hardly possible and moreover, presupposes a considerable absence of play on the transmission path between the electric actuating drive and the input element. Moreover, there is a need for a very precise manufacture of the cam or ramp surfaces of the input element and output element, as a result of which the production of this component is complicated and hence expensive.

SUMMARY OF THE INVENTION

An object of the present invention is to provide a deflection gear of the above-mentioned type that, with a structure that can be produced simply and inexpensively and that is also compact, has an even further increased transmission ratio.

A structural combination of an electric motor with a spindle thread-spindle nut drive unit can be very advantageously used to deflect parts in a motor vehicle. This relates primarily to parts in the power train of a motor vehicle, but such an actuator can also be used in other areas of the motor vehicle.

Accordingly, the invention provides an electromotive actuator for deflecting a vehicle part, comprising a rotatable component and a non-rotatable component, which are arranged coaxially inside each other, whereby the rotatable component can be driven by an electric motor in such a way that it can be moved linearly relative to the non-rotatable component between a first position and a second position. According to the invention, it is now provided that the two components of the actuator are configured as a threaded spindle and a threaded nut, whereby the rotatable component (threaded spindle or threaded nut) is non-rotatably connected to the rotor or to the armature of the electric motor and can act directly or indirectly on the vehicle part that is to be moved linearly.

The person skilled in the art is generally familiar with spindle thread-spindle nut drive units but their special use in a motor vehicle actuator is a part of the invention. In this context, as far as the technical success of the subject matter of the invention is concerned, it does not matter whether the threaded spindle or the threaded nut is arranged non-rotatably. Therefore, the description provided below of an electromotive actuator according to the invention also applies, of course, to its mechanically reversed construction, namely, if it is not the threaded spindle but rather the threaded nut that is arranged stationarily and non-rotatably.

Therefore, according to a first embodiment of this actuator, it is provided that the threaded spindle is arranged stationarily as well as non-rotatably and the threaded nut is arranged rotatably.

On its two axial ends, the threaded nut preferably has a ring flange facing radially towards the outside as well as a ring flange facing radially towards the inside, whereby the ring flange facing radially towards the outside is situated away from the vehicle part that is to be actuated while the ring flange facing radially towards the inside is situated on the threaded nut close to the vehicle part that is to be actuated.

According to another feature of the invention, it is provided that the radially inner circumferential surface of the threaded nut has a screw thread that engages with a correspondingly configured screw thread on the threaded spindle. As is known, through a concrete configuration of the screw thread, the actuator's conversion of the rotational movement of the electric motor into an axial movement can be set as needed.

The above-mentioned ring flange facing radially towards the inside—with its one axial surface—forms a stop for an axial movement of the threaded nut on the threaded spindle, so that the threaded nut is secured in a first actuation direction against unwinding from the threaded spindle.

Moreover, it is provided that, in the area of its ring flange facing radially towards the inside, the threaded nut has a thread—for example, a fine thread—on its radially outer circumferential surface, onto which an armature nut with a corresponding thread can be screwed.

In a refinement of this inventive detail, it is provided that the armature or rotor of the electric motor is arranged and clamped between the armature nut screwed onto the threaded nut and the ring flange facing radially towards the outside. As a result, a rotational movement generated by the electric motor can be transmitted directly to the threaded nut which then, as a function of the current rotational direction of the armature, moves in a screwing motion on the threaded spindle, thereby executing an axial movement.

As far as the threaded spindle is concerned, it can be provided that it is placed non-rotatably onto a preferably hollow-cylindrical guide tube or is formed in one piece with such a guide tube which itself is connected to a non-rotatable part of the motor vehicle. This non-rotatable part of the motor vehicle can be, for example, a clutch bell housing or a gear housing.

In another embodiment of the invention, the stator winding of the electric motor is attached to a stator yoke that, in turn, is firmly connected to a stator mounting plate, whereas the stator mounting plate is connected to the non-rotatable part of the motor vehicle.

Moreover, it can be provided that a sensor wheel having detectable profiling is clamped between the armature nut and the armature by means of a radial clamping section. This profiling can be configured in a generally known manner, that is to say, for example, in the form of external teeth on the sensor wheel or in the form of recesses on the outer circumference.

In another concrete embodiment of the sensor wheel, it is provided that, starting from the radial clamping section, the sensor wheel has a first axial section axially overlapping the armature nut, at least partially, that, starting from the first axial section, there is a radial section and subsequently, an axially receding second axial section having the detectable profiling is configured on the sensor wheel.

According to another aspect of the invention, it is provided that a ring-shaped stator carrier is arranged radially above the sensor wheel and the stator yoke is attached to said stator carrier, which is firmly connected via a spacer ring to the above-mentioned stator mounting plate.

A speed sensor and/or a torque angle sensor facing radially towards the inside is attached to the stator carrier and the profiling of the sensor wheel can be detected by said speed sensor and/or a torque angle sensor and transferred to a control unit associated with the electromotive actuator.

The stator carrier and the sensor wheel are arranged coaxially inside each other. Since the stator carrier is arranged non-rotatably and the sensor wheel is arranged rotatably, they do not touch each other. Nevertheless, they form the partially open housing of the electromotive actuator according to the invention.

Another feature of the invention is that the front surface of the armature nut facing the vehicle part that is to be actuated is directly or indirectly operatively connected to this vehicle part, and hence it can actively move it in at least one direction.

According to a concrete design, it is provided here that the front surface of the armature nut facing the vehicle part that is to be actuated is operatively connected to a clutch release bearing that, in turn, acts upon the vehicle part that is to be moved. Here, it can be provided that the front surface of the armature nut facing the vehicle part that is to be actuated can be laid axially against an outer ring of the clutch release bearing, while the front surface of the inner ring of the clutch release bearing facing away from the threaded nut lies against the vehicle part that is to be actuated.

In order to guide the outer ring of the clutch release bearing inside the electromotive actuator, it can be provided that the outer ring of the clutch release bearing has an axial section with which it lies on the radially outer circumferential surface of the armature nut so as to be axially movable.

In this context, it is considered to be advantageous if an uncoupling spring is arranged axially between the outer ring of the clutch release bearing and the sensor wheel or the armature so that, when the threaded nut executes an axial movement away from the vehicle part that is to be actuated and all the way to the stop, this uncoupling spring holds the outer ring in a desired position relative to the inner ring and also holds the inner ring in contact with this vehicle part, even when a force exerted by this vehicle part onto the inner ring of the clutch release bearing drops to the value of zero. Preferably, this uncoupling spring is configured as a helical compression spring.

In another embodiment, a sealing element is arranged between the threaded nut and the threaded spindle in the area of the ring flange of the threaded nut facing radially towards the outside. This advantageously prevents the penetration of dirt into the screw thread of the threaded nut and of the threaded spindle.

Moreover, it is felt to be advantageous for the thread of the threaded nut and of the threaded spindle as well as for the thread of the armature nut to be configured so as to be self-locking. This ensures that an adjustment position that has been assumed cannot be changed inadvertently due to the slight forces that are exerted during operation, but rather that the force of the electric motor is necessary for this purpose. Consequently, special components to ensure non-rotatability can be dispensed with in this design.

Finally, the described electromotive actuator is part of a motor vehicle actuating device, whereby the vehicle part that has been mentioned a number of times is a starting and shifting clutch or its diaphragm spring, a gear brake, a shift track actuator or a gear actuator or a slip coupling of a gear coupling device and/or a gear synchronization device of an automatic transmission or a shifting clutch on a differential gear. The actuator presented here can be constructed to be very small in terms of the actuation forces needed in a given application case, so that it can be used as a very precise adjustment device, also inside the housing of the above-mentioned aggregates or components.

BRIEF DESCRIPTION OF THE DRAWINGS

In order to elucidate the invention, the description is accompanied by a drawing in which an embodiment of an actuator structured according to the invention is depicted.

DETAILED DESCRIPTION

Figure 1:
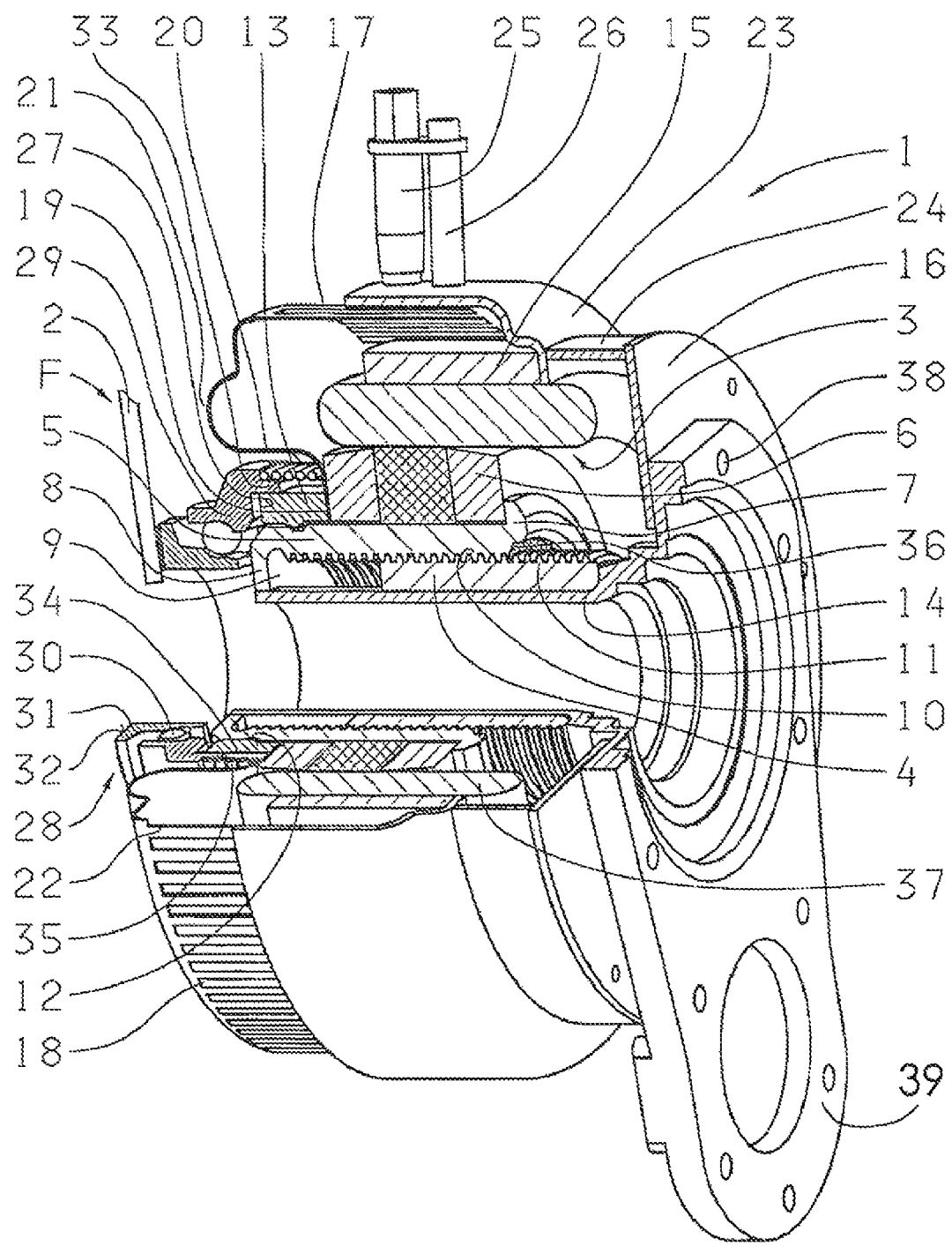

The single FIGURE shows an electromotive actuator 1 configured according to the invention, in a perspective and cutaway view. The part that is to be actuated in this embodiment is a vehicle component, especially a diaphragm spring 2 of a friction clutch, that is used as starting and shifting clutch in conjunction with an automatic transmission. Here, the actuator 1 is configured as a so-called central clutch release device that opens or closes the friction clutch as a function of control commands of a control device (not shown here) or else that brings it into certain slip operational positions.

For this purpose, the actuator 1 has an electric motor 3 that can be operated in two rotational directions, as a function of the particular actuation. This electric motor 3 is connected to a deflection gear in the form of a spindle thread-spindle nut arrangement that converts the rotational movement of the electric motor 3 into an axial, linear movement of the control unit of the actuator 1 so that ultimately, the diaphragm spring 2 can be axially deflected.

Below, the structural design of this actuator will be discussed in greater detail. The spindle thread-spindle nut arrangement consists of a threaded spindle 4 with a screw thread 11 onto which a threaded nut 5 with a corresponding screw thread 10 is screwed. In the embodiment shown here, the threaded spindle 4 is placed non-rotatably and axially immovably onto a hollow cylindrical guide tube 14 that is connected via a mounting plate 16 to a non-rotatable and stationary part 39 of the motor vehicle, for instance, to the gear housing. For this purpose, the mounting plate 16 has bores 38 through which fastening screws can be inserted.

The threaded nut 5 has a ring flange 7 facing radially towards the outside and a ring flange 8 extending radially towards the inside, whereby the latter has a stop surface 9 that, in order to limit the axial mobility of the threaded nut 5, can come to rest against an associated stop surface on the threaded spindle 4.

A sealing element 36 is clamped between the ring flange 7 of the threaded nut 5 facing radially towards the outside and the threaded spindle 4 and this sealing element 36 can reliably keep dirt out of the area of the screw threads 10, 11.

The ring flange 7 facing radially towards the outside serves as a ring shoulder for the axial placement of the armature 6 of the electric motor 3 which is its rotatable component, that is to say, its rotor. This armature 6 is slipped onto the radially outer circumferential surface of the threaded nut 5. An armature nut 13 screwed onto an outer thread 12 of the threaded nut 5 clamps the armature 6 between itself and the ring flange 7 facing radially towards the outside. This construction firmly connects the armature 6 to the threaded nut 5 so that said armature 6 can rotationally drive the threaded nut 5.

The stator of the electric motor 3 is arranged at a radial distance from the armature 6 and the winding 37 of this stator is supported by a stator yoke 15. The stator yoke 15, in turn, is firmly connected to the stator mounting plate 16 via a stator carrier 23 made of sheet metal and via a spacer ring 24, whereby as already mentioned, said stator mounting plate 16 is connected to a non-rotatable and stationary part of the motor vehicle.

As the single FIGURE shows, a sensor wheel 17 having detectable profiling 18 is secured between the armature nut 13 and the armature 6 by means of a radial clamping section 19 of the sensor wheel. Starting from the radial clamping section 19, the sensor wheel 17 has a first axial section 20 that axially overlaps the armature nut 13, at least partially, thus exerting a certain protective function for this area. This first axial section 20 is followed by a radial section 21, which, in turn, is followed by a second axial section 22 of the sensor wheel 17 that overlaps the first axial section 20, said sensor wheel 17 having the detectable profiling 18.

The profiling 18 in this embodiment is formed by cutouts in the second axial section 22 of the sensor wheel 17 that are arranged one after the other relative to the circumference.

A ring-shaped sensor carrier plate portion of the stator carrier 23 projects radially over the sensor wheel 17 and partially overlaps it axially. In this axial overlapping area, a sensor carrier 26 is arranged on the ring-shaped sensor carrier portion of the stator carrier 23 onto which a speed sensor or torque angle sensor 25 is attached. The sensitive side of this sensor 25 faces the profiling 18 of the sensor wheel 17 so that, when this profiling 18 is moved past the sensor, sensor signals are triggered that are transmitted to the control unit (not shown here). Using these sensor signals, the control unit generates control commands pertaining to the rotational direction and to the activation or stoppage of the electric motor 3, so that the axial travel of the actuator 1 can be set very precisely.

The structural design of the actuator 1 that has been described so far is actually sufficient for this actuator 1 to move vehicle parts 2 linearly. For this purpose, the front surface of the ring flange 8 extending radially towards the inside merely has to act upon such a vehicle part and/or has to be non-positively connected to this part. Such a utilization of the actuator 1 is practical, for example, if the vehicle part that is to be deflected does not execute a rotational movement. In contrast, in order to deflect rotating parts, a rotation uncoupling from the actuator 1 is necessary, which will be described below.

For purposes of the rotation uncoupling, between the diaphragm spring 2—which is to be actuated and which is rotating at the speed of the drive engine—and the threaded nut 5, a clutch release bearing 28 is arranged on the actuator 1 which, in this embodiment, is configured as a single-row angular ball bearing in which bearing balls 30 are arranged between an outer ring 29 and an inner ring 31. Here, the front surface 27 of the armature nut 13 facing the diaphragm spring 2 lies axially against the outer ring 29 of the clutch release bearing 28, while the inner ring 31 with its front surface 32 facing away from the threaded nut 5 lies against the diaphragm spring 2 that is to be actuated and it has no contact with the spindle nut 5.

In order to radially and axially guide the clutch release bearing 28, it is provided for the outer ring 29 to have an axial section 33 with which it lies on the radially outer circumferential surface 34 of the armature nut 5 so as to be axially movable.

Moreover, axially between the outer ring 29 of the clutch release bearing 28 and the sensor wheel 17 or the armature 6, there is an uncoupling spring 35 that, when the threaded nut 5 executes an axial movement away from the diaphragm spring 2 and all the way to the stop (stop surface 9), holds the outer ring 29 in a desired position relative to the inner ring 31 and also holds the inner ring 31 in contact with the diaphragm spring 2, even when a force F exerted by the diaphragm spring 2 onto the inner ring 31 of the clutch release bearing 28 drops to the value of zero. The uncoupling spring 35 is configured here as a helical compression spring.

As mentioned above, the screw threads 10, 11 and 12 of the threaded nut 5 and of the threaded spindle 4 as well as optionally also the thread of the armature nut 13 are configured so as to be self-locking and they are also capable of absorbing radial forces. The latter can also be achieved in that the above-mentioned threads have an additional, preferably radial contact surface in their core diameter or root diameter.

What is claimed is:

1. An electromotive actuator for deflecting a first motor vehicle part relative to a second motor vehicle part, comprising:
    a mounting element configured to connect, non-rotatably, to the second motor vehicle part, the second motor vehicle part being non-rotatable and stationary;
    a first component including a threaded nut disposed rotatably relative to the mounting element and acting directly or indirectly on the first motor vehicle part, the threaded nut having a first ring flange facing radially outwardly and a second ring flange facing radially inwardly, the first ring flange being disposed on an end away from the first vehicle part and the second ring flange is disposed close to the first motor vehicle part, wherein in an area of the second ring flange the threaded nut has a second thread on a radially outer circumferential surface;
    an armature nut screwed onto the second thread;
    a second component including a threaded spindle arranged coaxially with respect to the first component and further disposed non-rotatably relative to the mounting element, wherein a radially inner circumferential surface of the threaded nut has a screw thread that engages with a correspondingly configured screw thread on the threaded spindle;
    an electric motor having a rotor, wherein the first component is non-rotatably connected to the rotor so as to be linearly moveable relative to the second component between a first position and a second position; and
    a sensor wheel non-rotatably connected to the rotor and clamped between the armature nut and the rotor by means of a radial clamping section, the sensor wheel including detectable profiling.

2. The actuator as recited in claim 1, wherein the second ring flange has an axial surface forming a stop for an axial movement of the threaded nut relative to the threaded spindle.

3. The actuator as recited in claim 1, wherein the rotor is disposed and clamped between the armature nut and the first ring flange.

4. The actuator as recited in claim 1, wherein the threaded spindle is disposed non-rotatably relative to a guide tube connected to a non-rotatable part of the motor vehicle.

5. The actuator as recited in claim 4, wherein the guide tube is connectable to at least one of a clutch bell housing and a gear housing.

6. The actuator as recited in claim 1, wherein the electric motor includes a stator winding, a stator yoke, and a stator mounting plate connected to a non-rotatable part of the motor vehicle, the stator winding attached to the stator yoke and the stator yoke fixedly connected to the stator mounting plate.

7. The actuator as recited in claim 1, wherein the sensor wheel has a first axial section at least partially axially overlapping the armature nut, a second axial section having the detectable profiling, and a radial section between the first and second axial sections.

8. The actuator as recited in claim 1, further comprising a ring-shaped sensor carrier plate disposed radially outside the sensor wheel and fixedly connected via a-spacer ring to the stator mounting plate.

9. The actuator as recited in claim 8, further comprising at least one of a speed sensor and a torque angle sensor facing radially inwardly attached to the sensor carrier plate and wherein the profiling is detectable by the at least one of the speed sensor and the torque angle sensor.

10. The actuator as recited in claim 1, wherein a front surface of the armature nut facing the first motor vehicle part is directly or indirectly operatively connected to the first motor vehicle part.

11. The actuator as recited in claim 10, wherein the front surface of the armature nut is operatively connected to a clutch release bearing that acts upon the first motor vehicle part.

12. The actuator as recited claim 11, characterized in that the front surface of the armature nut is capable of being laid axially against an outer ring of the clutch release bearing.

13. The actuator as recited in claim 12, further comprising an uncoupling spring disposed axially between the outer ring of the clutch release bearing and the sensor wheel or the rotor so that, when the threaded nut executes an axial movement away from the vehicle part all the way to a stop, the uncoupling spring holds the outer ring in a desired position relative to the inner ring and holds the inner ring in contact with the first motor vehicle part, even when a force exerted by the first vehicle part onto the inner ring of the clutch release bearing drops to a value of zero.

14. The actuator as recited in claim 13, wherein the uncoupling spring includes a helical compression spring.

15. The actuator as recited in claim 10, wherein a front surface of an inner ring of the clutch release bearing facing away from the threaded nut lies against the first motor vehicle part.

16. The actuator as recited in claim 1, further comprising a sealing element disposed between the threaded nut and the threaded spindle in an area of the first ring flange.

17. The actuator as recited in claim 1, wherein the screw thread of the threaded nut, the screw thread of the threaded spindle, the second screw thread of the threaded nut and a screw thread of the armature nut are configured so as to transfer radial forces.

18. The actuator as recited in claim 1, wherein the actuator is adapted for use in a motor vehicle actuation device, wherein the motor vehicle actuation device includes the first motor vehicle part and wherein the first vehicle part is at least one of a starting and shifting clutch or its diaphragm spring, a gear brake, a shift track actuator or a gear actuator or a slip coupling of a gear coupling device and/or a gear synchronization device of an automatic transmission or a shifting clutch on a differential gear.

19. An electromotive actuator for deflecting a first motor vehicle part relative to a second motor vehicle part, comprising:
- a mounting element configured to connect, non-rotatably, to the second motor vehicle part, the second motor vehicle part being non-rotatable and stationary;
- a first component including a threaded nut disposed rotatably relative to the mounting element and acting directly or indirectly on the first motor vehicle part, the threaded nut having a first ring flange facing radially outwardly and a second ring flange facing radially inwardly, the first ring flange being disposed on an end away from the first vehicle part and the second ring flange is disposed close to the first motor vehicle part, wherein in an area of the second ring flange the threaded nut has a second thread on a radially outer circumferential surface;
- an armature nut screwed onto the second thread;
- a second component including a threaded spindle arranged coaxially with respect to the first component and further disposed non-rotatably relative to the mounting element, wherein a radially inner circumferential surface of the threaded nut has a screw thread that engages with a correspondingly configured screw thread on the threaded spindle;
- an electric motor having a rotor, wherein the first component is non-rotatably connected to the rotor so as to be linearly moveable relative to the second component between a first position and a second position; and
- a sensor wheel non-rotatably connected to the rotor, the sensor wheel including detectable profiling wherein a front surface of the armature nut facing the first motor vehicle part is directly or indirectly operatively connected to the first motor vehicle part and is operatively connected to a clutch release bearing that acts upon the first motor vehicle part, wherein the front surface of the armature nut is capable of being laid axially against an outer ring of the clutch release bearing wherein the outer ring of the clutch release bearing has an axial section lying on a radially outer circumferential surface of the armature nut so as to be axially movable.

* * * * *